United States Patent
Tsagas et al.

(10) Patent No.: US 6,553,820 B1
(45) Date of Patent: Apr. 29, 2003

(54) AIR PRESSURE INDICATOR FOR A VEHICLE TYRE

(76) Inventors: Nicolaos Tsagas, Lephkos Pyrgos, GR-671 00, Xanthi (GR), GR-671 00; Fotios Tsagas, Lephkos Pyrgos, GR-671 00, Xanthi (GR), GR-671 00

( * ) Notice: Subject to any disclaimer, the term of this patent is extended or adjusted under 35 U.S.C. 154(b) by 0 days.

(21) Appl. No.: 09/581,134
(22) PCT Filed: Oct. 12, 1999
(86) PCT No.: PCT/GR99/00037
§ 371 (c)(1), (2), (4) Date: Jun. 9, 2000
(87) PCT Pub. No.: WO00/21764
PCT Pub. Date: Apr. 20, 2000

(30) Foreign Application Priority Data
Oct. 15, 1998 (GR) .......................... 980100380

(51) Int. Cl.[7] .......................... G01H 17/02; B60C 23/02
(52) U.S. Cl. ........................................ 73/146; 73/146.3
(58) Field of Search ................. 73/146, 146.2–5, 73/146.8

(56) References Cited

U.S. PATENT DOCUMENTS

| 4,119,944 A | * | 10/1978 | Smith .......................... 340/58 |
| 4,529,961 A | * | 7/1985 | Nishimura et al. ............ 340/58 |
| 4,761,996 A | * | 8/1988 | Scmid et al. ............... 73/146.5 |
| 5,231,391 A | | 7/1993 | Rigaux ........................ 340/448 |
| 5,274,355 A | * | 12/1993 | Galan .......................... 340/445 |
| 5,531,109 A | * | 7/1996 | Tsagas ........................ 73/146.5 |
| 5,790,016 A | * | 8/1998 | Konchin et al. ............ 340/448 |

FOREIGN PATENT DOCUMENTS

WO    WO9213730    8/1992

* cited by examiner

Primary Examiner—Hezron Williams
Assistant Examiner—Lilybett Martir
(74) Attorney, Agent, or Firm—Dowell & Dowell, P.C.

(57) ABSTRACT

The present invention relates to a device which indicates the safety limits of the air pressure in each one of the pneumatic tires of a vehicle by transmitting appropriate information from the wheels to the driving control board. Transmission of information is based on the capacitive coupling between rotating and non-rotating conductive annular surfaces (2–5, 12–19, 72–75) which are mounted into channels of insulated bases (6–9) fixed in the available space between the bearing flange, the braking system and the wheel bearings (66) and are forming cylindrical and plane capacitors. An electronic circuit incorporates these capacitors as basic elements for its operation, and also an AC bridge (20) to give an automatic compensation by measuring the differential capacitance for each pair of the wheels to avoid faulty indication due to causes like humidity, temperature, etc. Also a simple electronic circuit can be used for each one of the wheels. A tire pressure sensor (1) comprises a semiconductor membrane (30) with an electrode (33) which is shorting out the rotating conductive surfaces (2, 3, 12, 13, 16, 17, 72, 73) when the tire pressure deviates from the safety limits resulting in a change of the original frequency and giving visual display or audio indication.

8 Claims, 6 Drawing Sheets

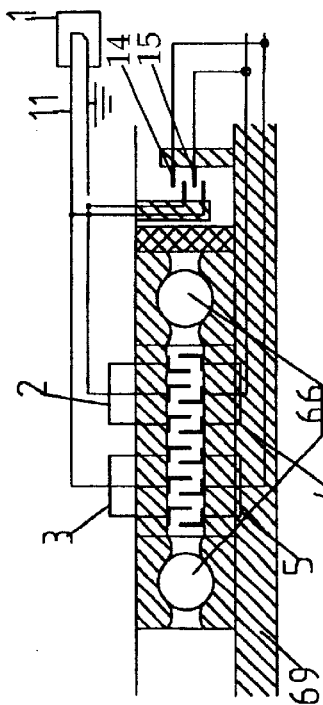
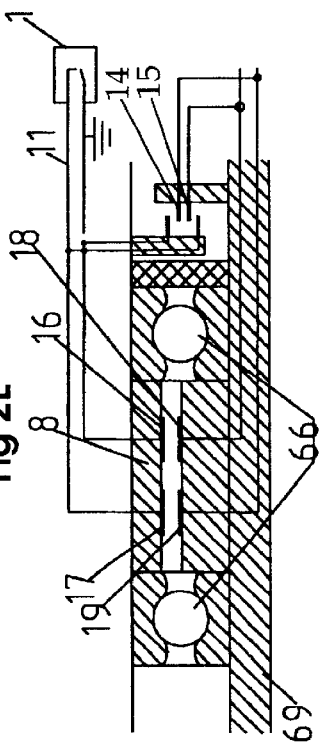
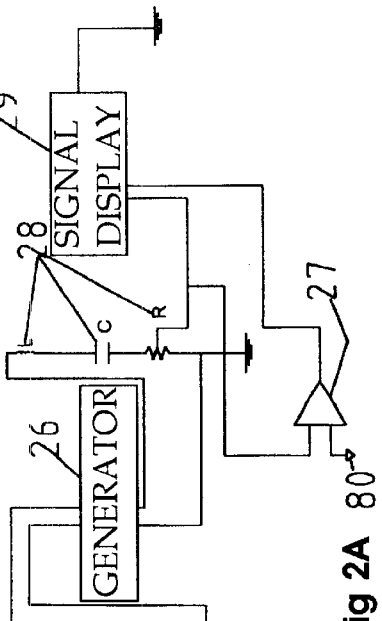
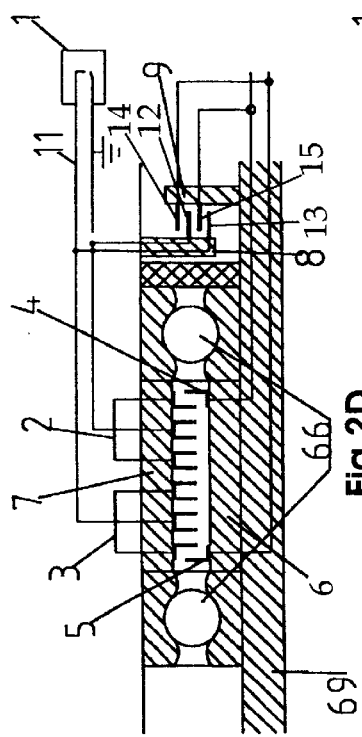
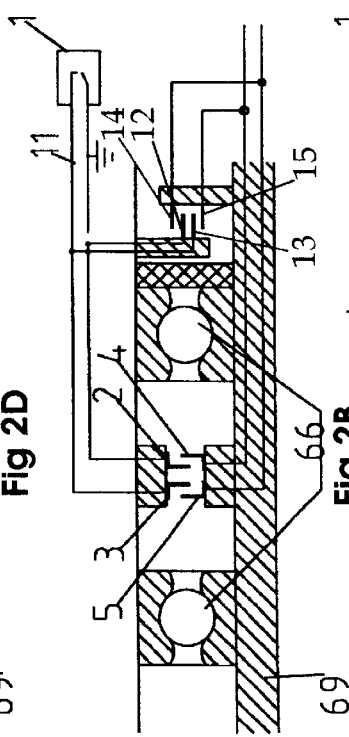
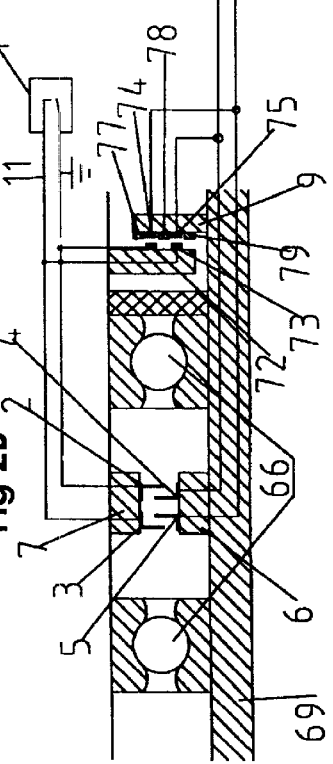

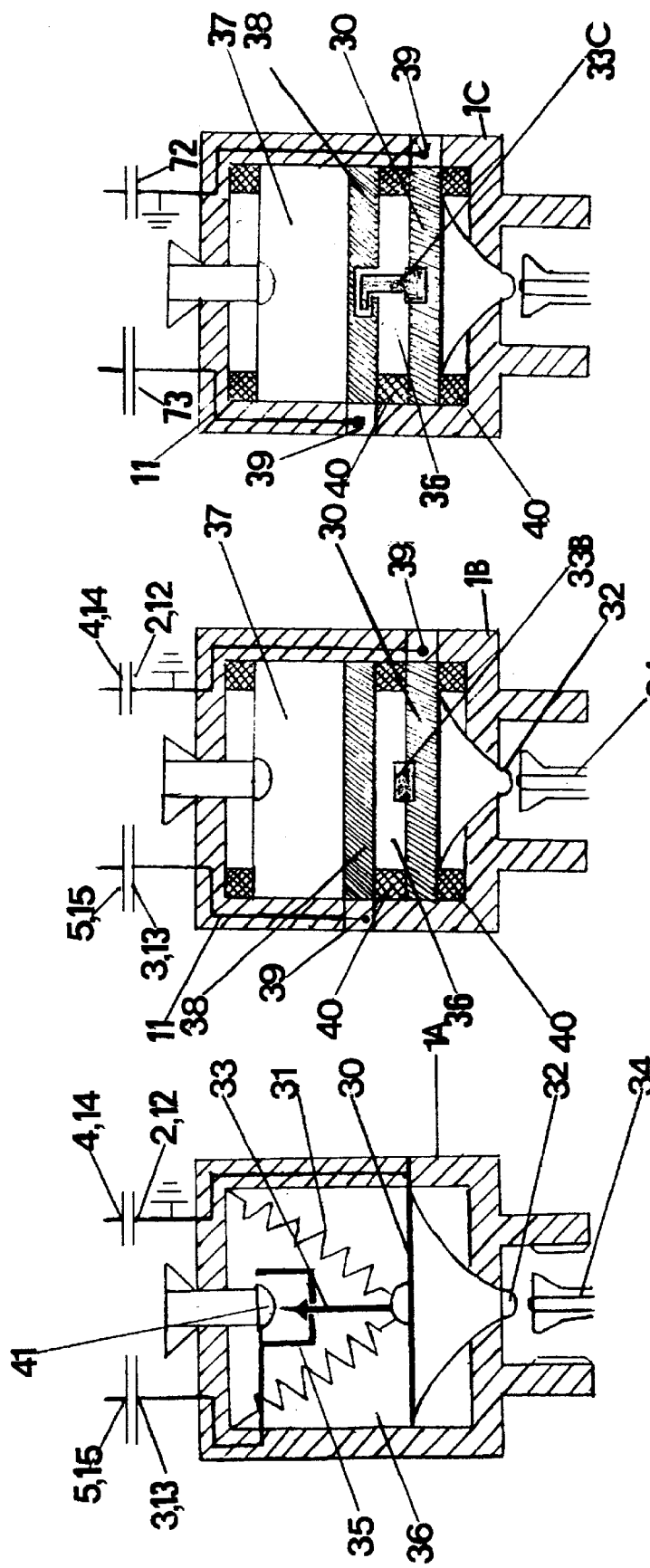

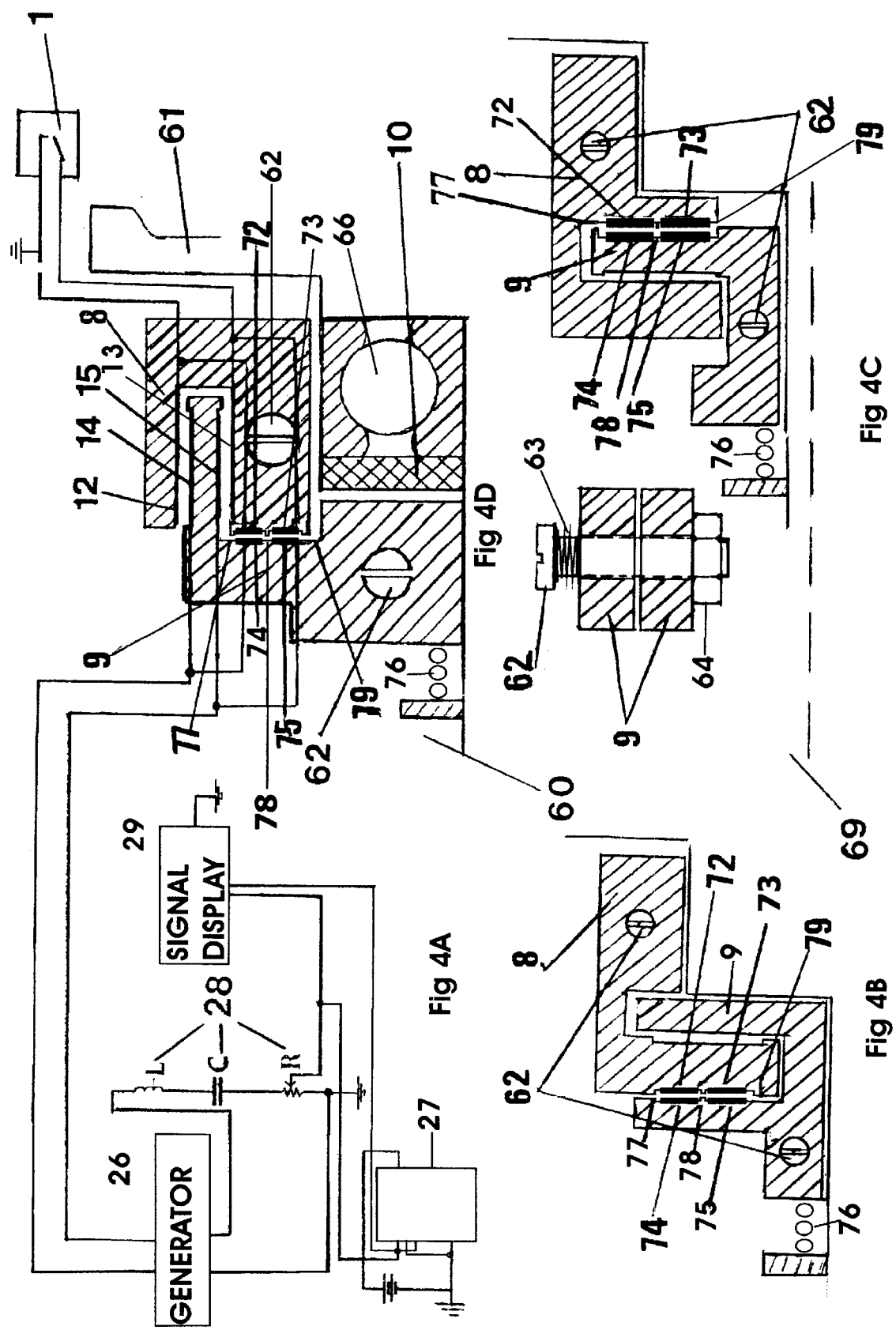

AIR PRESSURE INDICATOR FOR A VEHICLE TYRE

BACKGROUND OF THE INVENTION

1. Field of the Invention

The present invention relates to a device which indicates the safety limits of the air pressure in the pneumatic tires of a vehicle by transmitting information from the rotating wheel to the driving control board.

The operation of the device is based on a capacitive coupling between rotating and nonrotating conductive (metallic, carbon, etc.) coaxial cylindrical, coaxial annular and concentric annular surfaces mounted onto insulated bases. They are fixed into any available and suitable space between the rotating and the nonrotating part of the wheel assembly, which can be the space between the rotating bearing flange and nonrotating braking system or the space between the bearings of the wheel.

For each one of the wheels of the vehicle the system includes a tire pressure sensor mounted on the wheel which operates as an ON-OFF mechanical switch, according to the variations of the air pressure in the pneumatic tires. When the air pressure, in any one of the pneumatic tires of the vehicle, deviates from a normal predetermined value, the tire pressure sensor electrically connects the rotating conductive surfaces, thereby effecting an enhanced capacitive coupling between the above mentioned conductive surfaces which can be detected by an electronic circuit, by means of a visual or audio indication.

Over-or under-inflated tires are dangerous and could be avoided by the device of the present invention, which can operate as a road safety device.

The present invention eliminates all the disadvantages of the various patents which have been awarded in the past to the same inventor N. F. Tsagas from U.S. Pat. No. 5,531,109/Jul. 2, 1996, EPO 550701 B1/Oct. 16, 1995 and Australia 671583/May 3, 1997.

2. Description of the Prior Art

Various devices have been developed in the prior art to control the faulty air pressure in anyone of the tires of a vehicle. Basically the following principles of operation are used in those prior art devices.

a) The current collector system, wherein a current collector ring is used on the rotating part of the wheel and a collector brush is fixed at the nonrotating part of the wheel assembly to connect the tire pressure sensor and indicator of the device.

b) The wireless system, wherein a wireless frequency transmitter is mounted on the rotating part of the wheel, and a receiver is placed at the driving control board.

c) Resonance circuit system, wherein a detecting switch, an antenna and a circuit with inductance and capacitance are mounted onto the rotating tire and a transmitter and receiver at the nonrotating part of the vehicle, wherein an intermittent retransmission of the abovementioned circuit occurs in response to the variations in tire air pressure, this retransmission being of the same frequency as the resonance frequency of the circuit Various disadvantages are associated with the aforementioned systems of the prior art, wherein degradation of performance tends to occur, sooner or later, due to a) wear of the parts, b) batteries mounted onto the rotating wheels, c) integrated electronic circuits for the transmitter which are sensitive to the strains mounted onto the rotating wheels, d) complicate mechanism which tends to exhibit deviations in resonance and in general e) the installation of systems which make the device unreliable, under worsh conditions and needs employment of severe maintenance standards.

In the previous Tsagas's systems described in the aforementioned patents, various disadvantages being due to improper shape and locality of metallic strips, the electronic circuit and the pressure gauge made the device unreliable and caused installation difficulties.

SUMMARY OF THE INVENTION

The first object of the present invention is to provide an air pressure monitoring device in the pneumatic tires of a vehicle, which eliminates all the abovementioned disadvantages in order to achieve a) an accurate and reliable operation, b) a convenient and easy installation, c) a low cost with maintenance requirements close to zero and d) an additional safety capability to the driver.

A second object of the present invention is to provide an air pressure monitoring device in the pneumatic tires of a vehicle, with a special configuration and dimensions of rotating and nonrotating conductive coaxial cylindrical and annular surfaces within the wheel assembly, in order to achieve the highest possible capacity of the nonrotating conductive surfaces by shorting out the rotating conductive, metallic or carbon, surfaces and to eliminate parasitic capacitances.

A third object of the present invention is to provide a proper positioning for the conductive surfaces within the wheel assembly, so as to offer protection from temperature, humidity, water, dust, etc.

The fourth object of the present invention is to provide a proper electronic circuit so as to obtain optimum efficiency in the operation of the device in the desired limits of capacity changes.

Finally, a fifth object of the present invention is to provide a reliable tire pressure sensor of very small dimensions to operate as a mechanical switch of shorting out the rotating conductive surfaces after exceeding the safety limits of air pressure in the pneumatic tires of a vehicle.

The abovementioned objects of the present invention are implemented with the use of rotating conductive coaxial and concentric cylindrical and annular surfaces surrounding the nonrotating conductive cylindrical and annular surfaces mounted, rotating and nonrotating surfaces, onto insulated bases or metallic bases insulated by ceramic. They are fixed onto the rotating and nonrotating parts of the wheel assembly, in the location between the bearing flange and braking system and between the bearings of the wheel form cylindrical and plane air capacitors. An air pressure sensor, as a tire pressure sensor, of a vehicle operating as an ON-OFF mechanical switch can electrically short out the rotating conductive cylindrical and annular surfaces by means of a silicon membrane being curved accordingly to the air pressure changes. This tire pressure sensor can be positioned either on the existing valves or on a hiding place of the rim. The capacitance increase of nonrotating conductive surfaces, by shorting out the rotating conductive surfaces, can change the operating frequency of the electronic circuit. This can activate visual and audio indications corresponding to the tire with the faulty pressure.

One of the main advantages of the present invention is the coaxial and concentric cylindrical and annular configuration of the rotating conductive surfaces mounted onto insulated bases and surrounding the cylindrical and annular nonrotating conductive surfaces being mounted, by metal or carbon-plated, into shallow circular channels, which are opened onto the periphery of insulated bases. Some nonconductive concentric rings with negligible friction coefficient like ceramic and with small thickness surround and cover the conductive concentric annular surfaces and a spring is pressing the insulated base from back side. By this configuration the rotating and nonrotating conductive surfaces can be very close, in a constant distance, without touching each other. This coaxial cylindrical and annular configuration of conductive surfaces together with their proper positioning onto the insulated bases results to a maximum enhanced capacitive coupling between the abovementioned conductive surfaces, which thereby increases very much the operational efficiency of the device. Also the parasitic capacitances, due to mechanical defaults and vibrations of the rotating wheels, dust, water, humidity, temperature, surrounding metallic surfaces etc, are negligible.

BRIEF DESCRIPTION OF THE DRAWINGS

The application of the invention is described below by reference to the accompanying drawings, wherein the abovementioned objects and other novel features of this invention will become apparent to those skilled in the art.

FIG. 2 shows various longitudinal sectional views of the shaft of the wheel assembly, wherein the mechanical parts of the proposed device, in accordance to a second preferred embodiment, are comprising various configurations of rotating and nonrotating conductive coaxial and concentric cylindrical and annular surfaces onto different insulated bases fixed in a suitable space of the wheel assembly. Also shown is a block diagram of a resonance electronic circuit which can activate a visual display and a audio indication, when the rotating conductive surfaces are shorted out by the tire pressure sensor in case of ubnormal air pressure in any pneumatic tire.

FIG. 3 shows air pressure sensor with silicon membranes and substrates.

FIG. 4 shows various longitudinal sectional views of shaft of the wheel assembly, wherein the mechanical part of the device, in accordance to the third preferred embodiment, is comprising rotating and nonrotating conductive coaxial cylindrical and concentric annular surfaces mounted by carbon or metal-plated into shallow channels, being opened onto bases made by dense insulated material or insulated metallic bases, being fixed in the space between bearing flange and braking system onto the rotating oil collector and nonrotating shaft of the wheel assembly. The insulated cylindrical bases and the conductive surfaces are divided into two half pieces which are connected by means of bolts and nuts assemblies, for convenient and easy installation, and elastic spring washers being used to confront a metallic expansion of shaft due to heat. Nonconductive concentric rings with negligible friction coefficient like ceramic and with small thickness surround and cover the conductive concentric annular surfaces and a spring is pressing the insulated base from back side. The associated block diagram of the electronic circuit is the same as that of FIG. 2.

DETAILED DESCRIPTION OF PREFERRED EMBODIMENTS

Figure 1:
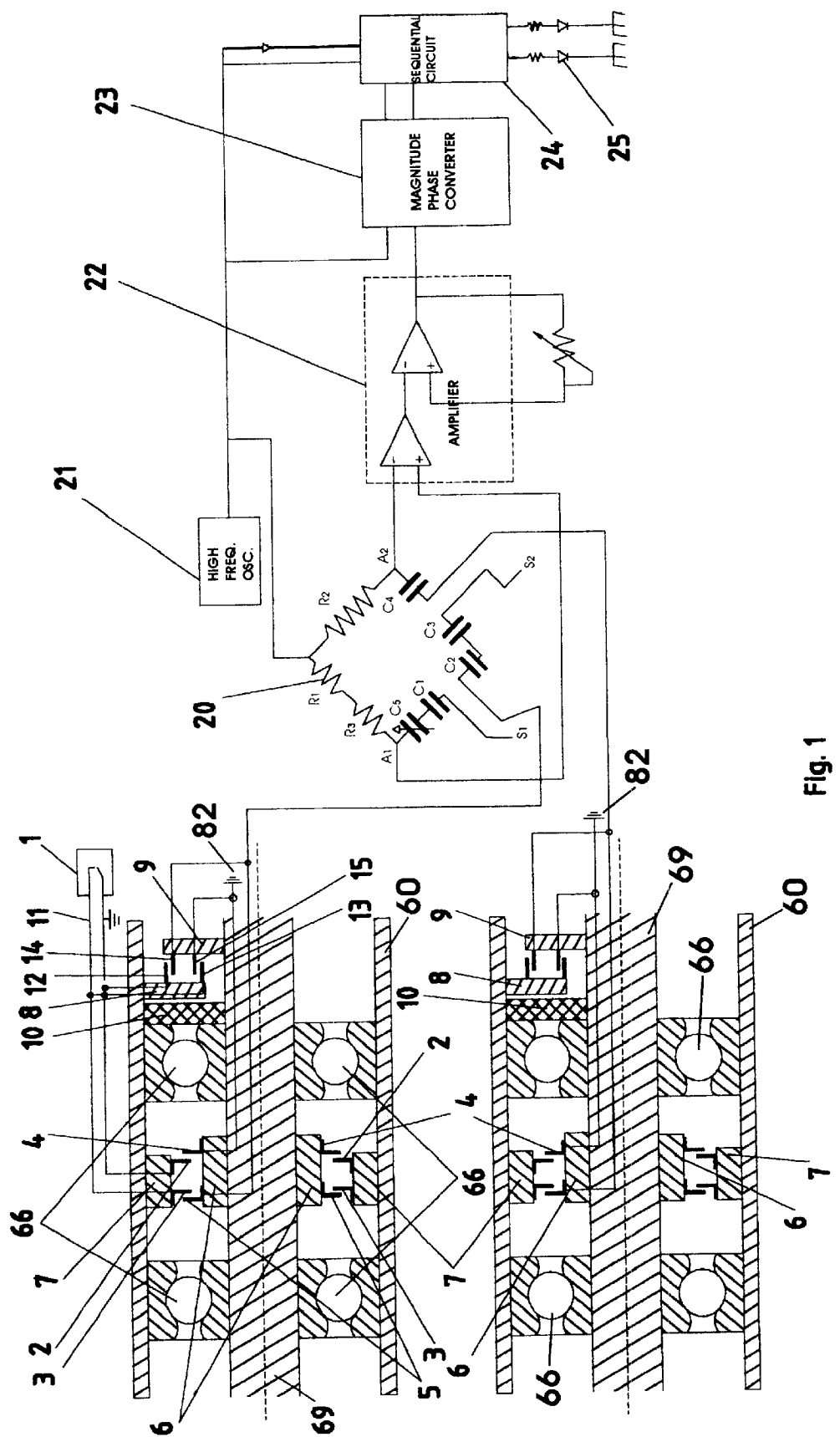
FIG. 1 provides a general view of the device and the shaft of the wheel assembly, wherein the mechanical part of the proposed device, in accordance to a first preferred embodiment, is comprising a system of rotating and nonrotating conductive coaxial cylindrical and annular surfaces mounted onto insulated bases fixed in the space between the bearing flange, the braking system, the bearings and the shaft of the wheel assembly. Also shown is a block diagram of the tire pressure sensor and the electronic circuit of the proposed device.

The detailed description of preferred embodiments and drawings herein, after being made by reference to the accompaning drawings, does not intend to limit the scope of the invention, and it will be readily understood by one skilled in the art that the present invention is not anticipated by the prior art. The proposed device of the air pressure sensor in the pneumatic tires of a vehicle, in accordance to the present invention, employs for each one of the wheels of the vehicle, a pair of rotating conductive, metallic or carbon, surfaces connected to a tire pressure sensor, mounted onto the wheel and another pair of nonrotating conductive, metallic or carbon, surfaces connected to an electronic circuit. Whenever the air pressure in any one of the tires of the vehicle deviates from a normal predetermined value, the tire pressure sensor shorts out the rotating conductive surfaces mounted onto the rotating part of the wheel assembly, thereby increasing the capacitance of the nonrotating conductive surfaces. This results to the activation of the abovementioned electronic circuit, by means of which a visual display or audio indication is given to the driver of the vehicle.

Referring to any one of the accompanying FIGS. 1, 2, 3 or 4 the device is shown to include a tire pressure sensor (1), a system of conductive coaxial annular surfaces (2, 3, 4, 5), conductive coaxial cylindrical surfaces (12, 13, 14, 15, 16, 17, 18, 19) and conductive concentric annular surfaces (72, 73, 74, 75) mounted onto insulated bases (6, 7, 8, 9), a high frequency oscillator in the MHz region (21), an amplifier (22), a magnitude and phase comparator (23), a sequential circuit (24), two diodes (25) for change of pressure into two wheels, a bridge (20) with three resistors (R1, R2, R3), a variable capacitor (C5), four capacitors (C1, C2, C3, C4) which are connected with two pairs of nonrotating conductive coaxial annular, and cylindrical surfaces for each pair of wheels.

In accordance to a first preferred embodiment of the invention, depicted in FIG. 1, there are two rotating conductive annular surfaces (2, 3) surrounded by two nonrotating conductive annular surfaces (4, 5), being fixed onto insulated bases (7, 6) in the space between the bearings (66) and two nonrotating conductive cylindrical surfaces (14, 15), surrounded by two rotating conductive cylindrical surfaces (12, 13) being fixed onto insulated bases (9, 8) in the space between the bearing flange (10) and the braking system of the wheel assembly (60). The abovementioned conductive, metallic or carbon, surfaces are adapted to operate as a variable capacitor which can show, by means of a visual display or audio indication, a deviation from normal of the air pressure in any one of the tires. This can be achieved by using, in the electronic circuit, a bridge assembly (20) which is supplied with a high frequency sinusoidal signal, and which is one of the usual cases of a reference stable voltage Vref (Clock oscillation).

By using as a reference the capacitances of the conductive surfaces (C1, C2) of one wheel to the first branch of the bridge (20) and the capacitances of the conductive surfaces (C3, C4) of the other wheel to the second branch of the same bridge (20), it is possible to detect the faulty air pressure in anyone of the two pneumatic tires with the same circuit. This can be done by detecting both the change of the signal width at the points A1 and A2 and the change of signal phase at the point A1, A2 in relation to the clock which shows the tire in which the air pressure has been changed. The change of the signal width under normal conditions R1=R2 and C1=C2 is zero because of the bridge balance. The advantage of applying the bridge method is that it requires only the half number of circuits in comparison to the number of the vehicle's wheels. The bridge method presupposes an unlikely appearance of a faulty pressure at the same time in both tires. In this case the possibility of faulty pressure appearance is small and it can become very small by examining various statistical data to select the proper pairs of the wheels. A change of the value of one of the capacitances C1 or C2 causes an appearance of voltage and a change of the signal phase in relation to the reference sinusoidal signal. The new signal is driven to the instrumentation amplifier (22) which produces a sinusoidal signal with reference to the earth. The following circuits amplify initially the signal and the F/F which follow can distinguish which one of the capacitances have been changed. The electronic circuit includes a gate NAND Schmidt Trigger, a resistor and a capacitor producing a square wave with frequency inversely proportional to the RC value. The system of rotating and nonrotating conductive coaxial cylindrical and annular surfaces, being used as a capacitance C, and the value of this capacitance depends on the ON-OFF position of the tire pressure sensor (1) which affects the frequency of the oscillator output signal. Therefore the problem of detecting the faulty air pressure in the pneumatic tires is to distinguish two different frequencies by the abovementioned electronic circuit. The AC bridge gives the possibility of automatic compensation of the system measuring differential capacitance, and therefore it can avoid to give faulty indications from changes of the capacitance due to reasons other than the faulty pressure (for example an increase of environmental humidity). The different weak signals of the bridge are amplified by high speed video instrumentation amplifiers, and for further signal amplification and construction of filters a quadruple operational amplifier of high speed and accuracy is used. In case of a low value of capacitances, due to the long distances between the conductive surfaces and their small area, makes necessary the operation of the system in high frequency.

In accordance to a second preferred embodiment of the invention, depicted in FIG. 2, a various number of rotating conductive annular surfaces (2, 3, 72, 73) and conductive cylindrical surfaces (12, 13, 17, 16) and nonrotating conductive annular surfaces (4, 5, 74, 75) and conductive cylindrical surfaces (14, 15, 18, 19), being fixed onto insulated bases (7, 6), (8, 9) in a suitable space of the wheel assembly, are taking alternately various combined positions and orientations in relation to each other and the axis of the wheels rotation. The non conductive concentric rings (77, 78, 79) with negligible friction coefficient like ceramic and with small thickness surround and cover the conductive concentric annular surfaces (72, 73, 74, 75) in order to prevent them from touching each other. The spring (76) is pressing the insulated base (9) to keep the conductive surfaces (72, 73, 74, 75) in a constant distance from each other. All the aforementioned conductive surfaces, metallic or carbon, are adapted to operate as a variable capacitor of a resonance circuit which includes a square signal generator (26), a comparator (e.g. a digital gate) (27), RLC of sinusoidal signal transformer (28) and a signal display indicator (29). The frequency of the waveforms produced by the generator (26) depends on the capacitance of the nonrotating conductive surfaces which in turn depends on the position ON-OFF of the air pressure sensor (1) which electrically connects and disconnects the rotating conductive surfaces. The first edge of the comparator is connected to the output of the RLC filter and the second is connected to a reference voltage Vref(80) which is about 1 volt Also, it has been added another circuit which produces a different pulse, when the device has any problem. So the driver is being informed (with different indications), when there is a problem with the tire ($1^{st}$ indication), and when there is a problem with the device ($2^{nd}$ indication). Last it has been developed a digital device in order to detect the change of the capacitance and to transfer the information from the wheels to the driver only through a cable. The function of this device is based on a CAN bus telecommunication system. This device is mainly consisted of a multivibrator connected to the aforementioned conductive surfaces variable capacitor and microcontrollers.

In accordance to a first preferred embodiment of the invention the tire pressure sensor, depicted in FIG. 3, comprises a silicon membrane of p-type (30) closing air-tightly, a small cavity (36) with metal-plated semiconductor substrate of n-type (37) and a silicon layer (40) being oxidized for insulation, wherein the curvature of the membrane s surface (30) is proportional to the air pressure, and the device pressure sensitivity is proportional to the area of the membrane (30) and inversely proportional to the intrinsic tensile stress, to the thickness of the membrane (30) and the gap spacing between membrane (30) and substrate (37), wherein the elastic feature of the membrane (30) is reinforced by the elastic properties of springs (31) and furthermore by a pressurized heavy gas filling up a chamber (36), with pressure equivalent to a normal tire pressure, wherein one end of a special shape electrode (33) with adjustable length is fastened on metal-plated membrane (30) and the other end of the electrode (33) moves between a pair of contact points (35, 41) or (39) being formed inside of the semiconductor substrate (37). The rotating conductive surfaces are connected with the tire pressure sensor (1) through a thin cable (11) being covered by a thick insulating substrate of small dielectric constant. In order to increase the capacitance of the nonrotating conductive surfaces after shorting out the rotating conductive surfaces and therefore to increase the reliability of the device, various combinations of more rotating and nonrotating conductive surfaces can be made. Mainly the reliability of the device is increased by reducing the distance between the rotating and nonrotating conductive surfaces and enlarging their area The device is operating as follows: Whenever the air pressure in any one of the pneumatic tires of the vehicle deviates from a normal predetermined value, the tire pressure sensor (1) electrically connects, by mechanical way, the rotating conductive surfaces [(2, 3), (72, 73), (12, 13) and (16, 17)] and thereby increases the capacitance of the nonrotating surfaces [(4, 5), (74, 75), (14, 15) and (18, 19)]. The system of rotating and nonrotating conductive surfaces, metallic or carbon, behaves as a variable capacitor being an element of the electronic circuit (20, 21, 22, 23, 24, 25) and (26, 27, 28, 29). The change of capacitance of this variable capacitor alters the frequency of the waveforms being produced by the generator (26), and this affects the digital gate (27) resulting to the activation of the electronic circuit, by means of which a warning display indication (29) is given to the driver of the vehicle.

In accordance to a third preferred embodiment of the invention depicted in FIG. 4, shallow circular channels on both sides of the insulated bases (7, 8) or (6, 9) are opened to obtain a significant increment of the capacitance after shorting out the rotating surfaces. These channels can be either carbon or metal-plated (by various ways, eg sputtering) or by fixing the metallic surfaces (12, 13, 14, 15), (72, 73, 74, 75) on the periphery of the channels and covering these metallic surfaces by a thin insulating layer (e.g. ceramic). The insulated bases (7, 8), (6, 9) (e.g. metallic covered by ceramic, dense plastic, polyamidio etc) and the conductive, metallic or carbon, surfaces (12, 13, 14, 15), (72, 73, 74, 75) are divided into two half pieces and are fixed by bolts (62), nuts (64) and elastic washers (63) onto the rotating oil collector (61) and the nonrotating shaft (69) of the wheel assembly.

Figure 5:
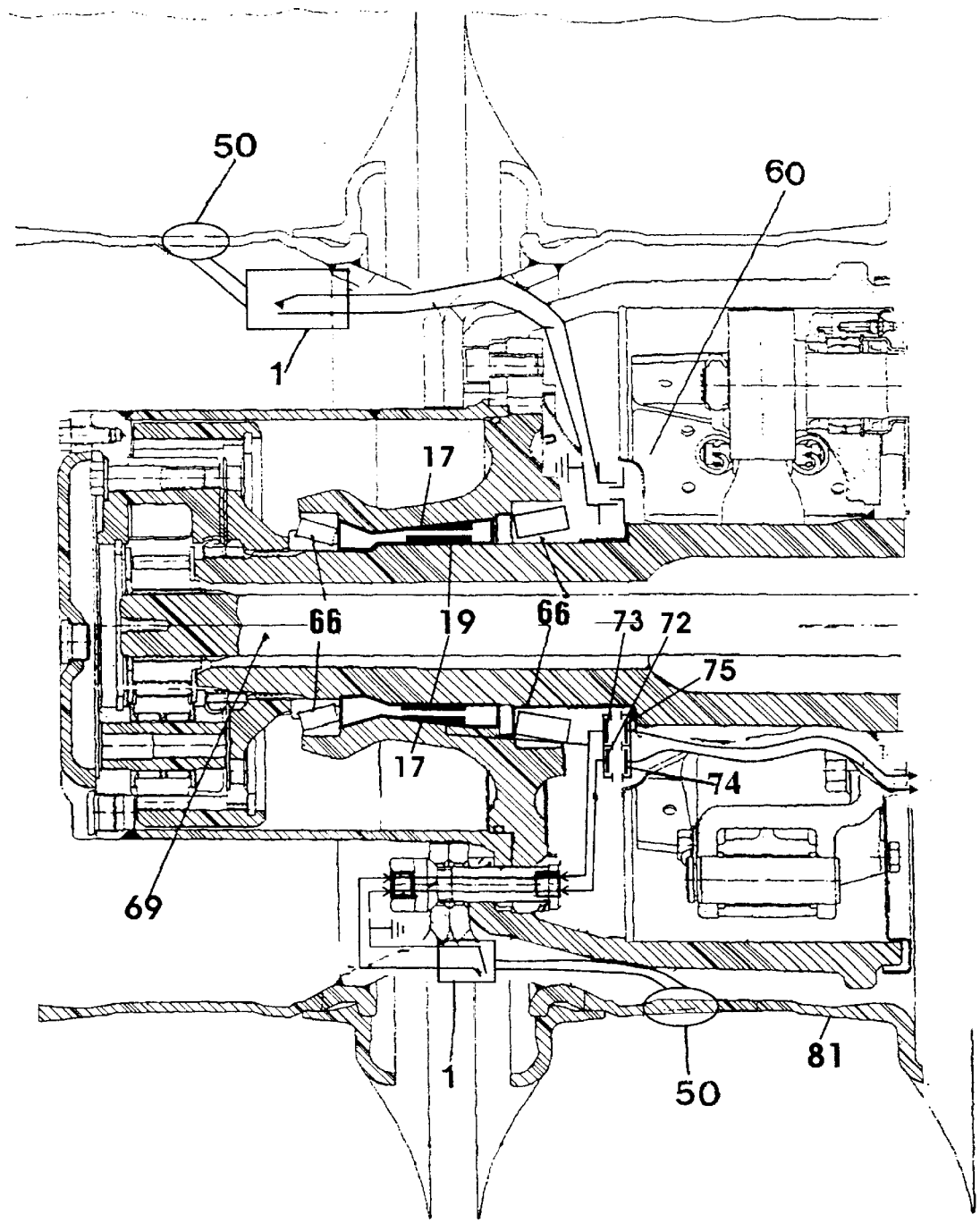
FIG. 5 shows a cross sectional view of a vehicle's twin wheels assembly wherein the mechanical part of the proposed tire pressure sensor, in accordance to a third preferred embodiment, again is comprising one pair of rotating and one pair of nonrotating conductive coaxial cylindrical surfaces, mounted onto insulated bases, fixed in the space between the bearing flange and the braking system. The above nonrotating surfaces are surrounded by the rotating surfaces. Also within this wheel assembly is shown rotating and nonrotating conductive, metallic or carbon, concentric annular surfaces mounted onto insulated bases which are fixed in the space between the bearing flange and the braking system or between the bearings of the wheel.

In accordance to a third preferred embodiment of the invention, the device in FIG. 5 comprises one pair of nonrotating conductive cylindrical surfaces surrounded by another pair of rotating conductive cylindrical surfaces, mounted onto insulated bases, fixed in the space between the bearing flange and braking system (51, 60) of a vehicle's twin wheels assembly. The tire pressure sensor (1) is placed onto the air inlet valve (50). Also within this wheel assembly the conductive concentric annular surfaces (72, 73) and (74, 75) are mounted onto insulated bases, fixed in the space between the bearing and the shaft of the wheel. The rotating conductive surfaces, metallic or carbon, are connected with the air pressure sensor (1) by two thin cables through a hole along the bolt (53) by connecting plugs (54).

Figure 6:
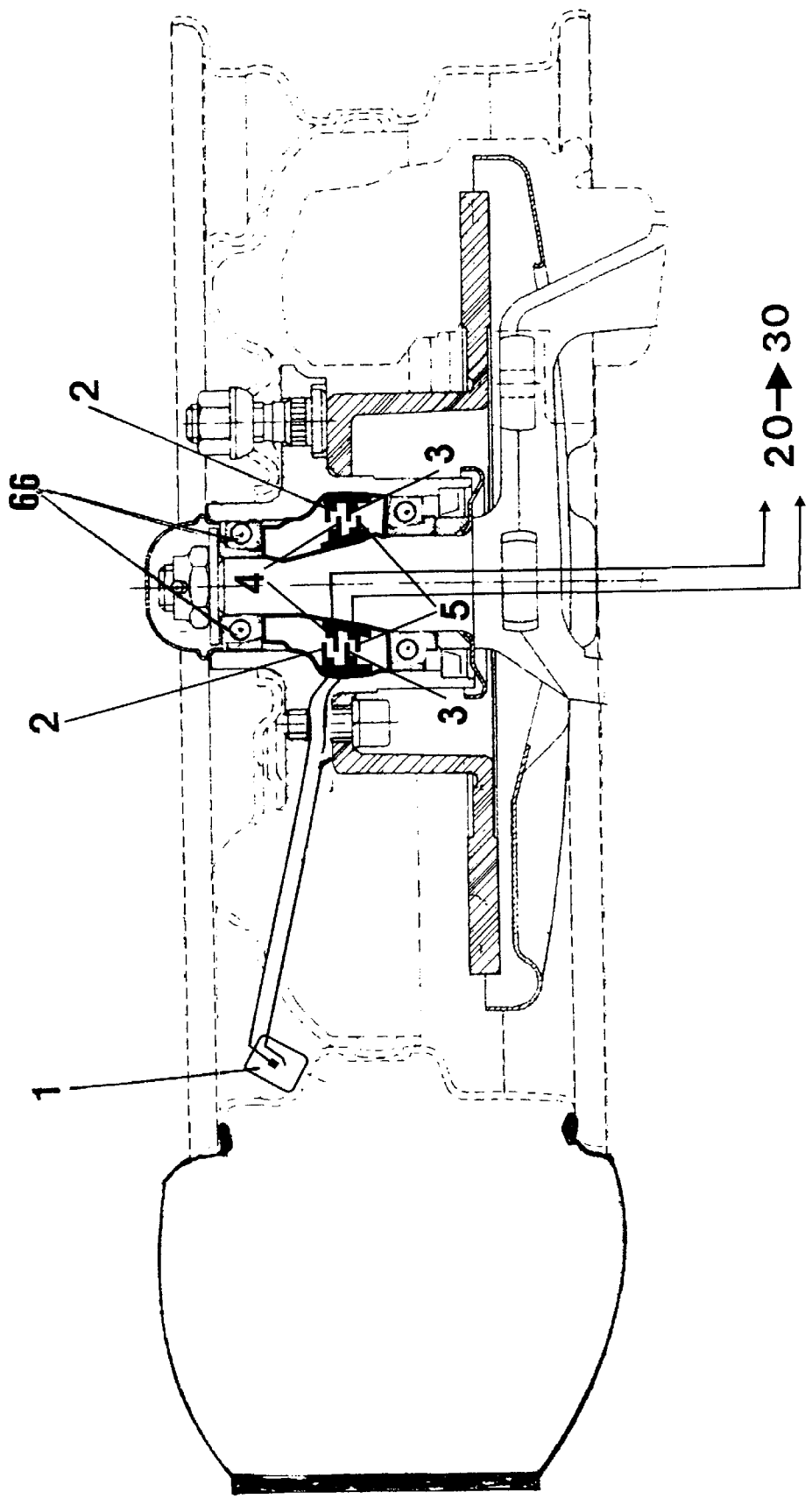
FIG. 6 shows a cross sectional view of a vehicle's wheel assembly, wherein the mechanical part of the proposed tire pressure sensor mounted onto insulated bases, fixed in the space between the bearings and the shaft of the wheel, in accordance to a second preferred embodiment, again comprises two rotating and two nonrotating conductive annular surfaces, wherein the first nonrotating conductive surface is surrounded by two rotating conductive surfaces and the second rotating conductive surface is surrounded by two nonrotating conductive surfaces. Also within the wheel assembly, rotating and nonrotating conductive coaxial cylindrical or concentric annular surfaces can be mounted onto insulated bases fixed in the space between the bearing flange and the braking system of the wheel.

In accordance to a second preferred embodiment of the invention, the device in FIG. 6 comprises two rotating (2, 3) and two nonrotating (4, 5) conductive annular surfaces, wherein the first nonrotating surface (4) is surrounded by two rotating surfaces (2, 3) and the second rotating surface (3) is surrounded by two nonrotating surfaces (4, 5) onto insulated bases fixed in the space (45) between the bearings (66) of a vehicle's wheels assembly. Also within the wheel assembly, rotating and nonrotating conductive coaxial cylindrical or concentric annular surfaces can be mounted onto insulated bases fixed in the space between the bearing flange and the braking system of the wheel.

A contact coupling method is using two collecting brushes mounted onto the nonrotating part of the wheel assembly, which in turn are on a continuous contact with two rotating concentric rings which can be shorted out by the tire pressure sensor (1) which operates as a switch and results in passing a current through the collecting brushes to activate a visual or an audio indicator of the device, warning the driver for the deviation from normal air tire pressure.

Also a magnetic coupling method is using two or more coils being mounted onto the rotating part of the wheel and the same number of coils onto the nonrotating part of the wheel.

Finally the electromagnetic coupling method is using photodiodes (OD) p.i.n and p.n without internal gain and photoemitters (LED) being mounted onto the rotating part of the vehicle's wheel. Also photodiodes (OD) with internal gain, phototransistors (APD) and photoemitters (LED) is mounted onto the nonrotating part of the wheel assembly. When the rotating OD and LED are shorted out by the tire pressure sensor (1), a light is emitted to the nonrotating OD resulting to the activation of a display indication.

What is claimed is:

1. A device for indicating safety limits of air pressure in tires of at least two wheel assemblies of a vehicle, the device including for each of the at least two wheel assemblies of the vehicle a first conductive surface, a second conductive surface, a third conductive surface and a fourth conductive surface, a first pair of conductive surfaces including said first and second conductive surfaces, said first pair of conductive surfaces being mounted onto an insulated base fixed onto a rotating portion of each wheel assembly, and a second pair of conductive surfaces including said third and fourth conductive surfaces, said second pair of conductive surfaces being mounted onto an insulated base fixed onto a nonrotating shaft of each wheel assembly, a pair of air capacitors being formed between said first pair and said second pair of conductive surfaces, an electronic circuit which includes a high frequency oscillator, an amplifier, a magnitude and phase comparator, a sequential circuit, two diodes, and a bridge circuit with three resistors and four capacitors which are connected with said nonrotating conductive surfaces for each of said at least one pair of wheels, a detection circuit that also includes a pulse generator, a comparator, RLC sinusoidal wave transformer, and a signal display and a tire pressure sensor including means for converting air pressure variations in the tires into displacement of a semiconductor membrane to thereby operate as an ON-OFF switch which shorts out said first with second conductive surfaces with a metallic frame of the wheel assembly when in an ON position when air pressure in a tire is abnormal, said pair of air capacitors being adapted to operate as a variable capacitor in said electronic circuit wherein a first frequency range is produced by said pair of air capacitors when the ON-OFF switch is in an OFF position, and a second frequency range is produced by said pair of air capacitors when the ON-OFF switch is in the ON position which results in said electronic circuit activating the signal display to thereby reflect a tire with abnormal air pressure.

2. The device for indicating of claim 1, wherein said first pair of conducting surfaces is formed as a complete or a segment of an annular conductive surface, one of said second pair of conducting surfaces is formed as a second complete or a segment of an annular conductive surface, said first complete or a segment of an annular conductive surface being coaxially mounted relative to said second complete or a segment of an annular conductive surface on a rotating cylindrical housing between an outer bearing and a bearing flange or between the bearing flange and a braking system of a wheel assembly, each of said first pair of conductive surfaces being connected to one of said tire pressure sensors by an insulated wire to the metallic frame of a wheel assembly, each of the second complete or segment of an annular conductive surfaces being mounted onto the nonrotating shaft inside or outside said bearing flange of the wheel assembly, and wherein each of said second pair of conductive surface is connected with said electronic circuit and a metallic frame of the vehicle.

3. The device for indicating of claim 1, wherein one of said first pair of conductive surfaces is formed by one or more complete or segments of concentric and coaxial annular conductive surfaces and the other of said first conductive surfaces is formed by one or more coaxial cylindrical conductive surfaces of the same radius, said one of said first pair being mounted onto said bases fixed onto a rotating housing between a bearing and a bearing flange and said other of said first pair being mounted on bases fixed at an end of the shaft of the wheel assembly, one of said second pair of conductive surfaces being formed by one or more complete or segments of concentric and coaxial annular conductive surfaces and the other of said second pair of conductive surfaces being formed one or more cylindrical conductive surfaces of the same radius which are coaxial with the other of said first pair of conductive surfaces a non conductive material with negligible frictional coefficient covering said first and second pair of conductive surfaces to prevent them from touching and a spring to maintain said one of said first and second pairs of conductive surfaces at a constant distance from each other, and wherein said first pair of conductive surfaces are grounded to the metallic frame of the wheel assembly by said tire pressure sensor and said nonrotating conductive surfaces are connected to a metallic frame of the vehicle by said electronic circuit.

4. The device for indicating of claim 1, wherein one of said first pair of conducting surfaces includes one or more rotating coaxial cylindrical conductive surfaces of the same radius which are electrically separated by an insulating layer and are mounted onto an insulated cylindrical base which are fixed onto the rotating shaft of the wheel assembly between a bearing and a flange and wherein one of said second pair of conductive surfaces includes two nonrotating coaxial cylindrical conductive surfaces of the same radius, electrically separated by an insulating layer, said nonrotating conductive surfaces being mounted onto a nonrotating insulated base mounted between said bearing and said flange and said nonrotating conductive surfaces being surrounded by said rotating cylindrical conductive surfaces, wherein the axis of said rotating and nonrotating cylindrical conductive surfaces and the axis of cylindrical insulated bases coincide with an axis of rotation of the wheel assembly said rotating cylindrical conductive surfaces being connected or disconnected with the metallic frame of the wheel assembly by said air tire pressure sensorby a wire covered by insulated material, and said nonrotating cylindrical conductive surfaces being connected with a metallic frame of the vehicle through said electronic circuit.

5. The device for indicating of claim 1, wherein said tire pressure sensor includes a semiconductor membrane closing a cavity with metal-plated semiconductor substrate, and a semiconductor layer being oxidized for insulation, wherein the curvature of said membrane is proportional to air pressure in the tire, wherein one end of an electrode is fastened on said metal-plated membrane and the other end of said electrode moves between a pair of contact points, said electrode being displaced proportionally to the air tire pressure, shorting out said rotating conductive surfaces with the metallic frame of the wheel assembly whenever the air tire pressure is abnormal.

6. The device for indicating of claim 1, comprising for each of the wheels of the vehicle, one of said electronic circuits, a signal display indicator and a tire pressure sensor.

7. A device for indicating safety limits of air pressure in tires of at least two wheel assemblies of a vehicle, the device including for each of the at least two wheel assemblies of the vehicle a first conductive surface, a second conductive surface, a third conductive surface and a fourth conductive surface, a first pair of conductive surfaces including said first and second conductive surfaces, said first pair of conductive surfaces being mounted onto an insulated base fixed onto a rotating portion the each wheel assembly, and a second pair of conductive surfaces including said third and fourth conductive surfaces, said second pair of conductive surfaces being mounted onto an insulated base fixed onto a nonrotating shaft of the wheel assembly, a pair of air capacitors being formed between each said first pair and said second pair of conductive surfaces, an electronic circuit which includes a bridge circuit having a first branch connected to a first of said air capacitors associated with a first of said at least two wheel assemblies and a second branch connected to the other of said air capacitors associated with the other of said at least two wheel assemblies, an output of said bridge circuit being in a balanced state with respect to a reference signal into said bridge circuit when input signals from said pair of air capacitors to said first and second branches are equal but being in an unbalanced state when the signal inputs from said pair of air capacitor are not equal such that an output of said bridge circuit generates an output signal in phase relationship to said reference signal as an indication of abnormal air pressure in one of the tires of said at least one pair of wheel assemblies, an air pressure sensor mounted to each of the tires, said air pressure sensors being connected to said first pair of conductive surfaces such that if an abnormal air pressure is sensed in one of the tires, at least one of said first and second conductive surfaces becomes shorted whereby the input signal from one of said pair of air capacitors to said bridge circuit is changed relative to the input signal from the other of said pair of air capacitors, and display means connected to said electronic circuit for displaying when an abnormal air pressure is sensed in one of the tires.

8. The device of claim 7 wherein each of said first conductive surfaces are oriented generally coaxially with respect to each of said third conductive surfaces and each of said second and fourth conductive surfaces are mounted in opposing relationship with one another and spaced from said first and third conductive surfaces.

* * * * *